United States Patent
Bosveld et al.

(10) Patent No.: US 11,390,033 B2
(45) Date of Patent: Jul. 19, 2022

(54) PREDICTIVE FLOW CONTROL RESPONSES IN AN ADDITIVE MANUFACTURING SYSTEM

(71) Applicant: Stratasys, Inc., Eden Prairie, MN (US)

(72) Inventors: Michael D. Bosveld, Bloomington, MN (US); Zachary Mady, Farmington, MN (US); Mark Schletty, Eden Prairie, MN (US)

(73) Assignee: Stratasys, Inc., Eden Prairie, MN (US)

( * ) Notice: Subject to any disclaimer, the term of this patent is extended or adjusted under 35 U.S.C. 154(b) by 618 days.

(21) Appl. No.: 16/327,570

(22) PCT Filed: Sep. 12, 2016

(86) PCT No.: PCT/US2016/051316
§ 371 (c)(1),
(2) Date: Feb. 22, 2019

(87) PCT Pub. No.: WO2018/038751
PCT Pub. Date: Mar. 1, 2018

(65) Prior Publication Data
US 2019/0217546 A1 Jul. 18, 2019

Related U.S. Application Data

(60) Provisional application No. 62/378,483, filed on Aug. 23, 2016.

(51) Int. Cl.
*B29C 64/393* (2017.01)
*B33Y 50/02* (2015.01)
(Continued)

(52) U.S. Cl.
CPC .......... *B29C 64/393* (2017.08); *B29C 64/106* (2017.08); *B29C 64/209* (2017.08);
(Continued)

(58) Field of Classification Search
CPC ... B29C 64/106; B29C 64/209; B29C 64/227; B29C 64/386; B29C 64/393; B33Y 10/00; B33Y 30/00; B33Y 50/02
See application file for complete search history.

(56) References Cited

U.S. PATENT DOCUMENTS 5,733,319 A   3/1998 Neilson et al.
5,900,207 A * 5/1999 Danforth ........... C04B 35/63488
                                                        264/603

(Continued)

FOREIGN PATENT DOCUMENTS

CN   104669623 A   6/2015
JP     5920859 B2   5/2016
(Continued)

OTHER PUBLICATIONS

China Office Action, 201690001741.4, dated Sep. 17, 2019, 4 pages.
(Continued)

*Primary Examiner* — Yuhui R Pan
(74) *Attorney, Agent, or Firm* — Peter J. Ims; Westman, Champlin & Koehler, P.A (57) ABSTRACT

An additive manufacturing system includes an extruder having a motor and a pressure sensor. A filter receives speed values for the motor and generates a predicted pressure value from the speed values. A response threshold module sets a response threshold pressure value based on the predicted pressure value such that when the response threshold pressure value is between a pressure value from the pressure sensor and the predicted pressure value, a response is executed.

23 Claims, 6 Drawing Sheets

(51) Int. Cl.
  *B29C 64/106* (2017.01)
  *B29C 64/386* (2017.01)
  *B33Y 10/00* (2015.01)
  *B33Y 30/00* (2015.01)
  *B29C 64/209* (2017.01)
  *B29C 64/227* (2017.01)

(52) U.S. Cl.
  CPC .......... *B29C 64/227* (2017.08); *B29C 64/386* (2017.08); *B33Y 10/00* (2014.12); *B33Y 30/00* (2014.12); *B33Y 50/02* (2014.12)

(56) References Cited

U.S. PATENT DOCUMENTS

| | | |
|---|---|---|
| 6,004,124 A | 12/1999 | Swanson et al. |
| 6,398,329 B1 | 6/2002 | Boyd et al. |
| 6,955,558 B1 | 10/2005 | Low et al. |
| 7,891,964 B2 | 2/2011 | Skubic et al. |
| 2009/0241650 A1 | 10/2009 | Kondo et al. |
| 2012/0070523 A1 | 3/2012 | Swanson et al. |
| 2014/0048969 A1 | 2/2014 | Swanson et al. |
| 2014/0113527 A1 | 4/2014 | Lindsay et al. |
| 2015/0097307 A1* | 4/2015 | Batchelder ............ B29B 13/022 264/40.6 |
| 2015/0097308 A1 | 4/2015 | Batchelder et al. |
| 2016/0075089 A1 | 3/2016 | Royo et al. |
| 2016/0116361 A1 | 4/2016 | Debeurre et al. |
| 2016/0193621 A1 | 7/2016 | Mori et al. |
| 2016/0198576 A1 | 7/2016 | Lewis et al. |
| 2016/0370246 A1 | 12/2016 | Russell et al. |
| 2017/0036228 A1 | 2/2017 | Thurow et al. |
| 2017/0052531 A1* | 2/2017 | Minardi ................ B29C 64/393 |
| 2018/0200955 A1 | 7/2018 | Hoelldorfer et al. |

FOREIGN PATENT DOCUMENTS

| | | |
|---|---|---|
| WO | 2015050958 A2 | 4/2015 |
| WO | 2016014543 A1 | 1/2016 |

OTHER PUBLICATIONS

International Search Report and Written Opinion dated May 24, 2017 for corresponding International Application No. PCT/US2016/051316, filed Sep. 12, 2016.

International Search Report and Written Opinion dated May 19, 2017 for International Application No. PCT/US2016/051303, filed Sep. 12, 2016.

Second Office Action for CN 201690001746.7, dated Jan. 8, 2020; 2 pages.

Notification of Allowance for CN 201690001746.7, dated Mar. 20, 2020; 2 pages.

Communication pursuant to Rules 161(1) and 162 EPC for EP 16778509.6, dated Mar. 29, 2019; 3 pages.

Office Action for CN 201690001746.7, dated Sep. 26, 2019; 5 pages.

* cited by examiner

PREDICTIVE FLOW CONTROL RESPONSES IN AN ADDITIVE MANUFACTURING SYSTEM

CROSS-REFERENCE TO RELATED APPLICATION

This Application is a Section 371 National Stage Application of International Application No. PCT/US2016/051316, filed Sep. 12, 2016 and published as WO2018/038751 on Mar. 1, 2018, in English, which claims the benefit of U.S. Provisional Patent Application Ser. No. 62/378,483, filed on Aug. 23, 2016, the contents of which are hereby incorporated by reference in their entirety.

BACKGROUND

Additive manufacturing, also called 3D printing, describes a group of technologies with the common characteristic of adding material to form a 3D part rather than subtracting material as in traditional machining Using additive manufacturing techniques, a three-dimensional solid object of virtually any shape can be printed from a digital model.

Additive manufacturing technologies can be used for prototyping (where it has been used for many years) and also for end-use production parts. For end-use part production, it is desirable to print net-shape parts, or near-net shape parts (i.e., parts that match very closely to the digital image provided as a source data file, and therefore require little or no post-print processing to achieve the desired tolerances for the size and shape for the part).

In extrusion-based additive manufacturing, parts are printed layer-by-layer with each layer extruded onto a previously deposited layer. The extruded layer is forced out of a nozzle in a print head by an extruder that can take the form of a viscosity pump.

In screw pump extruders used in additive manufacturing applications, consumable material is drawn into a chamber where it is pressurized, melted, and becomes flowable. The material is transported by the rotation of a screw that is driven by a motor. As the screw rotates, threads of the screw impart an axial force to the molten material that causes the molten material to move down the threads toward the nozzle. The rate at which the screw rotates controls the rate at which the molten material is extruded. A gantry moves the extruder in a suitable spatial motion to print the extruded material along tool paths to form a 3D part.

SUMMARY

An additive manufacturing system includes an extruder having a motor and a pressure sensor. A model receives speed values for the motor and generates a predicted pressure value from the speed values. A response threshold module sets a response threshold pressure value based on the predicted pressure value such that when the response threshold pressure value is between a pressure value from the pressure sensor and the predicted pressure value, a response is executed.

A method includes initializing an additive manufacturing system by constructing a model, such as one that uses a filter to generate a frequency response of sensed pressures to extruder speeds. A part is printed using the additive manufacturing system by sending extruder speed command signals to the extruder to cause the extruder to extrude material. Extruder speed signals are sent to the model to generate a sequence of predicted pressure values. A sequence of pressure values are sensed and for each sensed pressure value, a determination is made as to whether the sensed pressure value differs enough from a corresponding predicted pressure value in the sequence of predicted pressure values to warrant taking an action.

An additive manufacturing system includes a print head having an extruder that provides material to a nozzle to deposit a layer of the material on a part. A model generator identifies parameters for an algorithm that models how pressure in the nozzle varies with changes in motor speed. A loss-of-extrudate monitor applies motor speed values to the model to produce expected pressure values, uses the expected pressure values to identify pressure thresholds that represent a loss of extrudate, and sends a signal to a print manager when a pressure in the nozzle is beyond one of the identified pressure thresholds.

DETAILED DESCRIPTION OF ILLUSTRATIVE EMBODIMENTS

Extrusion-based additive manufacturing systems can experience a loss of extrusion (LOE) failure during which the extruder produces less extrudate than expected for a given actuator speed command. An insufficient volumetric flow rate of material out of the extruder nozzle will result in a weakened or defective area of the part.

Active monitoring and control of the pressure within a print head of an extrusion-based additive manufacturing system has been challenging in the past, and has only been indirect, due to equipment size constraints, and instrument reliability. Thus, active response to pressure variation during dynamic movements of the extruder print head has not been possible. With the present invention, a more accurate prediction of the expected pressure is provided to more accurately extrude material during dynamic movement of the extruder and print head system, resulting in high accuracy part building (net and near-net).

One cause of LOE is material starvation of the extruder pump during which material is not made available to the input of the pump. Because there is insufficient material at the input to the pump, the pressure at the output of the pump drops in correspondence to the rate at which the input of the pump is starved of material.

A second cause of LOE is a plugged nozzle, which prevents the extrudate from leaving the print head. In general, plugged nozzle LOE failures result in an increase in pressure within the nozzle because the extruder continues to apply force to the molten material within the nozzle even after the nozzle is plugged.

Since the pressure changes during an LOE event, one would expect that LOE's could be detected by measuring the pressure in the nozzle and comparing the measured pressure to fixed thresholds that are representative of the LOE events. However, the present inventors have discovered that simply measuring the pressure within the nozzle and comparing that pressure to fixed upper and lower pressure limits is unsatisfactory. Such a simple scheme results in a large number of false positive alerts if the limits are set too narrowly and misses actual LOE events if the limits are set too broadly.

In addition, the pressure in the nozzle changes as the rate of extrudate deposited through the nozzle changes. When extrudate is needed at a faster rate, the actuator speed is increased producing an increase in pressure within the nozzle. When a lower rate of extrudate is needed, the actuator speed is decreased producing a decrease in pressure within the nozzle. Such changes in the extrudate rate and internal nozzle pressure occur frequently in additive manufacturing systems where the print head moves at different speeds along different portions of the tool path. When the print head is moving quickly, the rate of extrudate must be increased so that there is enough extrudate to achieve the proper extruded volume. When the print head is moving slowly, the rate of extrudate must be decreased to avoid forcing excess material over the sides of the part or causing other deformations in the layer of material. Since the changes in the rate of extrudate result in changes in the internal pressure of the nozzle, setting fixed pressure limits can cause an alert to be triggered whenever the velocity of the print head changes.

In accordance with the embodiments described below, an expected pressure within the nozzle is predicted from sequences of past extruder actuator speeds. Upper and lower pressure limits are then identified from the expected pressure. With each new value of the speed, a new expected pressure and new upper and lower pressure limits are identified.

In particular embodiments, the expected pressure is predicted by using a model of the frequency response of the internal nozzle pressure to sequences of actuator speeds. The frequency response is determined during an initializing phase when sequences of actuator speeds and corresponding sequences of internal nozzle pressures are converted to the frequency domain and the ratio of the frequency domain nozzle pressures over the frequency domain actuator speeds is used as the frequency response. Parameters are then determined for the model so that the model provides the determined frequency response.

Figure 1:
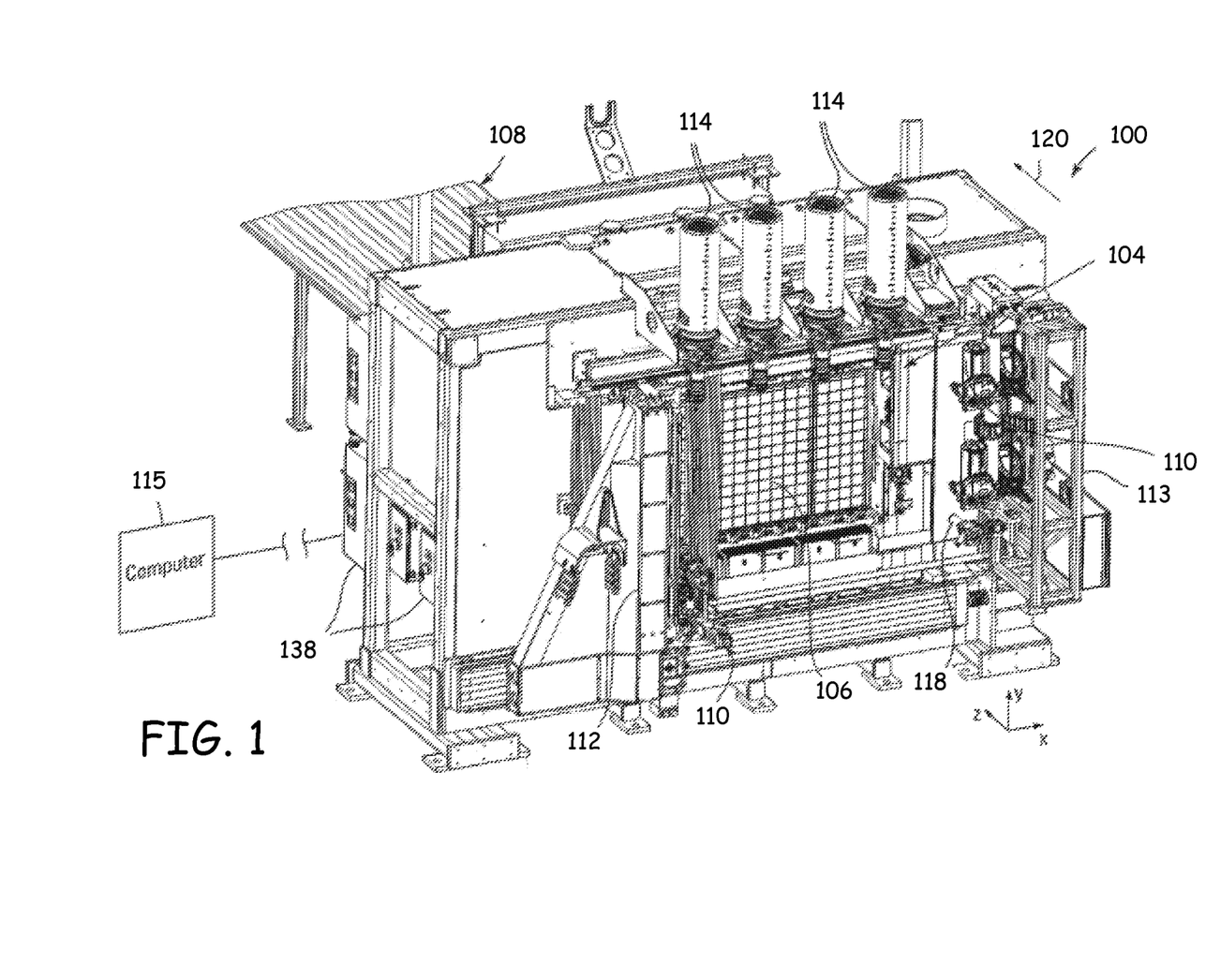
FIG. 1 is a block diagram of an additive manufacturing system in accordance with one embodiment.

Embodiments of the present disclosure may be used with any suitable layer-based additive manufacturing system that extrudes material. FIG. 1 shows one such system 100, which is a first exemplary manufacturing system for printing or otherwise building 3D items, support structures, and/or scaffolds horizontally using a layer-based, additive manufacturing technique. Suitable systems for system 100 include extrusion-based additive manufacturing systems developed by Stratasys, Inc., Eden Prairie, Minn. under the trademark "FDM". In horizontal printing, the print axis is parallel to the print plane, and movement is perpendicular to the print plane. Although a system for horizontal printing is shown in FIG. 1, embodiments described herein may also be used with any extrusion-based additive manufacturing systems, including vertical axis printers and multi-axis robotic systems.

As shown in FIG. 1, system 100 includes chamber 104, platen 106, platen gantry 108, print head 110, head gantry 112, tool changer 113, and consumable assemblies 114. Chamber 104 is in one embodiment enclosed by chamber walls, and initially contains platen 106 for printing desired 3D items.

In the shown example, print head 110 is an interchangeable single-nozzle screw extruder head configured to extrude consumable materials along tool paths in a layerwise manner to thereby print a 3D item, support structure, and scaffold onto a receiving surface of platen 106. A plurality of additional print heads 110 may be stored, for example within tool changer 113 as shown in FIG. 1, and may be interchangeably used for different printing functions. In one embodiment, tool changer 113 holds three or more separate print heads.

Print head 110 is supported by head gantry 112, which in the exemplary embodiment is a gantry assembly configured to move print head 110 along tool paths in (or substantially in) the x-y plane parallel to platen 106. Alternatively, print head 110 can be supported by a robotic arm or other gantry assembly configured to move the print head 110 in 2D or 3D tool paths across platen 106 in any suitable spatial motion, including gantry positioning to any coordinate location in the workspace, and/or pitch-yaw-roll motions.

System 100 also includes in one embodiment controller 138, which is one or more control circuits configured to monitor and operate the components of system 100. For example, one or more of the control functions performed by controller 138 can be implemented in hardware, software, firmware, and the like, or a combination thereof. Controller 138 may communicate with chamber 104 (including any heating mechanism), a drive mechanism within an extruder of print head 110, a pressure sensor within print head 110, gantries 108 and 112 and various other sensors, calibration devices, display devices, and/or user input devices over suitable communication lines.

System 100 may also communicate with a computer 115 located with system 100 or remote therefrom, which may be one or more computer-based systems that communicate with system 100 and/or controller 138 and may be separate from system 100, or alternatively may be an internal component of system 100. Computer 115 includes computer-based hardware, such as data storage devices, processors, memory modules and the like for generating and storing tool path and related printing instructions. The computer 115 may transmit these instructions to system 100 (e.g., to controller 138) to perform printing operations.

Print head 110 includes a local hopper, which carries a supply of particle-based consumable material, such as is disclosed in U.S. Pat. No. 8,955,558, during operation, controller 138 may direct print head 110 to shear and melt successive amounts of the item and support material provided from the hopper in print head 110. Periodically, the local hopper is refilled with material in consumable supply sources 114.

Print head 110 further includes an extruder 150 comprising a motor 220 and a drive mechanism 221 for pressurizing, melting and extruding the consumable material. The drive mechanism 221 includes a screw or impeller that is rotated by motor 220. The molten consumable material is driven by drive mechanism 221 as the drive mechanism is rotated by motor 220 through a suitable arrangement (e.g., gears, belts, etc.) based on speed commands sent by the controller 138. Drive mechanism 221 drives the consumable material through extruder 150 and a nozzle 226 in the direction indicated by arrow 225. The molten consumable material is discharged from the nozzle 226 as an extrudate that forms a layer of the 3D part and/or support structure on the platen 106. One exemplary impeller-driven viscosity pump extruder is disclosed in U.S. Pat. No. 7,891,964.

Print head 110 may initially print one or more layers of support structure onto the receiving surface of platen 106 to provide a base for the subsequent printing. This maintains good adhesion between the layers of a 3D item and a build sheet, and reduces or eliminates any tolerance to flatness between the receiving surface of the platen 106 and the x-y plane.

After the support structure is initially printed, print head 110 may then print layers of the 3D part, and optionally any additional layers of scaffold or support structure. The layers of support structure are intended to support the bottom surfaces of the 3D item along the printing z-axis against curl forces, and any support layers are intended to brace the 3D item against gravity along the vertical y-axis. Printing is performed in this embodiment in a Z-direction indicated by arrow 120.

Figure 2:
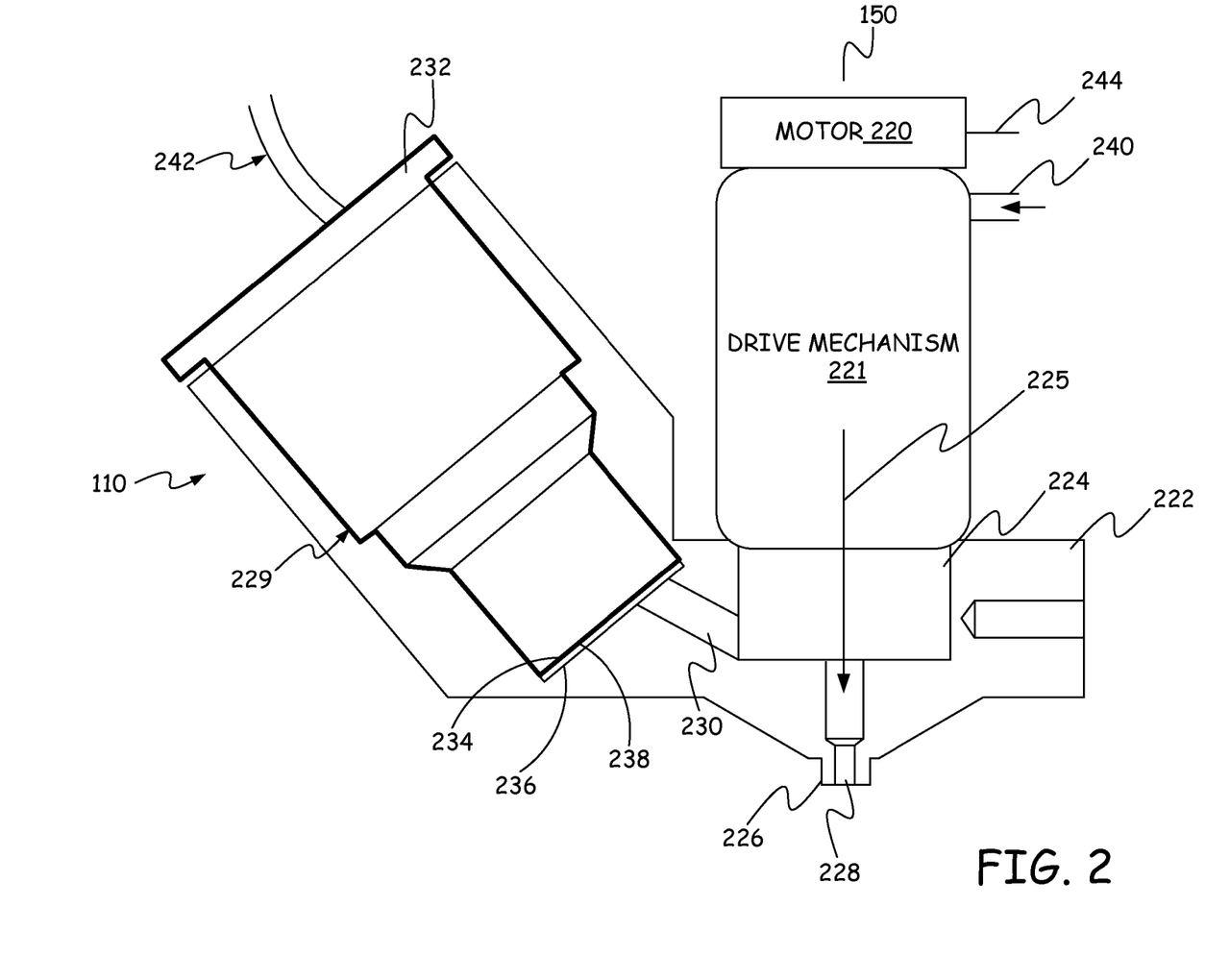
FIG. 2 is a side sectional view of an extruder, nozzle and pressure sensor assembly in accordance with one embodiment.

FIG. 2 provides a sectional view of a portion of an exemplary print head 110 showing extruder 150, which includes drive mechanism 221 driven by a motor 220. In accordance with one embodiment, print head 110 is the same as the print heads disclosed in International Application No. PCT/US2016/051303, filed Sep. 12, 2016, which is incorporated by reference in its entirety. Extruder 150 is mounted to a die 222 that defines a chamber 224, a nozzle 226, an outlet 228 extending from chamber 224 to the tip of nozzle 226, a pressure sensor receiving area 229, and a port 230 extending between chamber 224 and pressure sensor receiving area 229. A pressure sensor module 232 is inserted in and mounted to pressure sensor receiving area 229, such that a pressure sensor diaphragm 234 is spaced from an end 236 of pressure sensor receiving area 229 by a gap 238.

In operation, motor 220 actuates drive mechanism 221 causing it to transport material from a material input 240 to chamber 224. While drive mechanism 221 is moving the material, heaters around drive mechanism 221 melt the material to form a molten material that is output into chamber 224. The molten material in chamber 224 is pressurized by the action of drive mechanism 221 causing it to fill port 230 and gap 238 and to flow through die outlet 228 of nozzle 226 to thereby form an extrudate. The molten material in gap 238 presses against pressure sensor diaphragm 234 and in response, pressure sensor module 232 generates a pressure signal along communication lines 242.

The speed at which drive mechanism 221 moves material from input 240 to chamber 224 is controlled by an actuator speed signal received on a control line 244 by motor 220. The speed values are provided by controller assembly 138, which in one embodiment updates the speed values multiple times per second based on a desired volumetric flow rate of extrudate to be extruded through nozzle 226. In particular embodiments, controller assembly 138 changes the speed values for motor 220 based on the velocity of print head 110. For example, when print head 110 is moving faster, the speed of motor 220 is increased to increase the flow rate of extrudate output through nozzle 226 so that a desired layer thickness and road width are maintained. As print head 110 slows down, the speed of motor 220 is slowed to reduce the flow rate of extrudate output through nozzle 226, thereby printing a road of a desired size to form features of the 3D part. Using the active pressure monitoring and control techniques of the present invention, the volumetric flow rate from extruder is dynamically controlled in real-time as the print head is moved at variable speeds along toolpaths. The resulting 3D part is a near-net shape or net shape part.

As the speed of motor 220 changes, the pressure of molten material in chamber 224 and thus the pressure of material in gap 238 also changes. In general, the pressure increases as the speed of motor 220 increases and the pressure decreases as the speed of motor 220 decreases. Due to the properties of some materials, the changes in pressure tend to lag the changes in the actuator speed and the average pressure tends to increase as the average speed increases. As a result, the pressure changes and the actuator speed changes lack a one-to-one correspondence.

Figure 3:
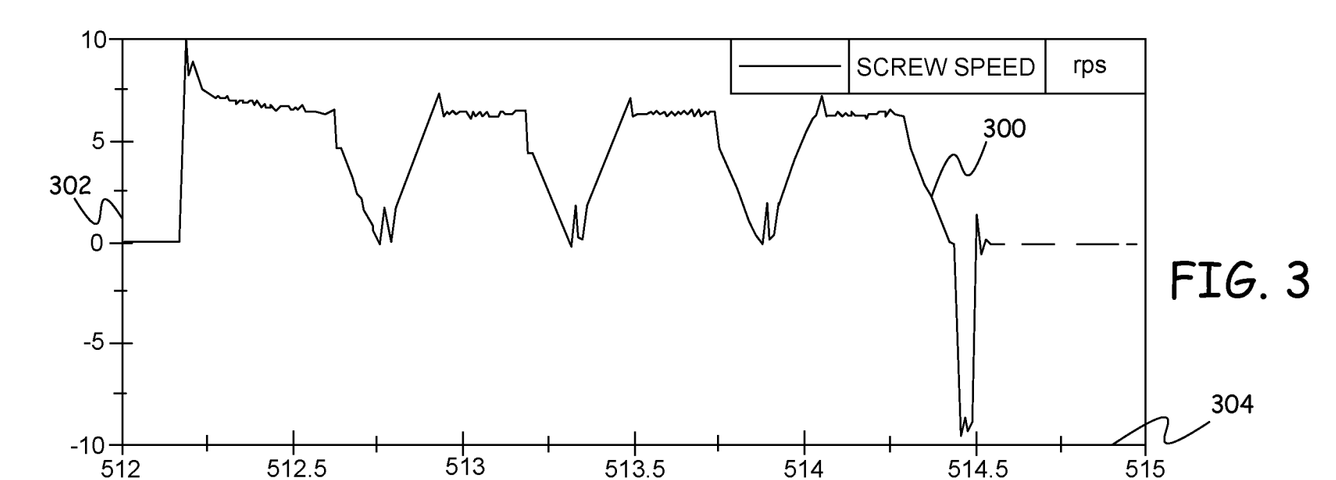
FIG. 3 shows graphs of motor speed values.
Figure 4:
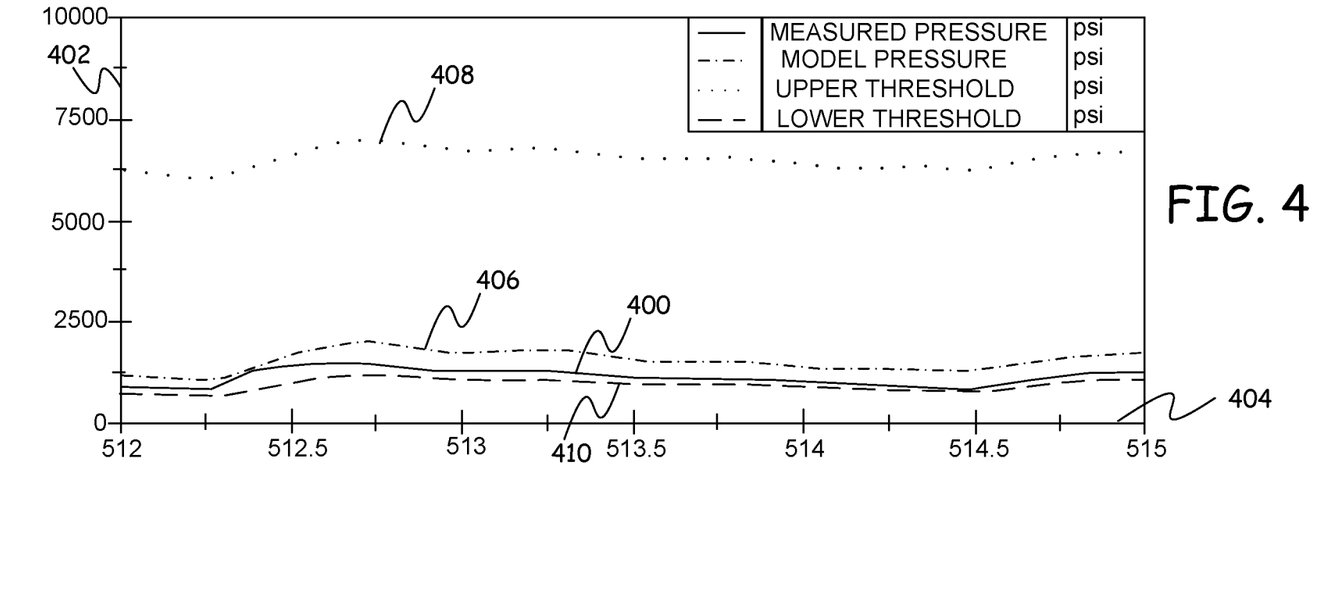
FIG. 4 shows graphs of predicted pressure values, conditioned actual pressure values, high pressure threshold values and low pressure threshold values for the motor speed values of FIG. 3, in accordance with one embodiment.

FIG. 3 provides a graph 300 showing changes in the speed of 220 over time. In FIG. 3, the motor speed is shown on vertical axis 302 and time is shown on horizontal axis 304. FIG. 4 provides a graph 400 of conditioned (see below) melt pressures in gap 238 over the same time period as shown in FIG. 3. In FIG. 4 melt pressure is shown along vertical axis 402 while time is shown on horizontal axis 404. Comparing graphs 300 and 400, it can be seen that the melt pressure lags the motor speed such that changes in the melt pressure occur after corresponding changes in the motor speed. Further, it can be seen that the average melt pressure decreases with a constant average motor speed. Thus, the melt pressure has been discovered by the present inventors to be a complex function of the motor speed and the melt pressure at a current time is dependent on a sequence of past motor speeds. In accordance with the various embodiments, the relationship between the motor speed and the resulting pressure is modeled as a frequency response where different frequencies of the motor speed result in different nozzle pressures.

Figure 5:
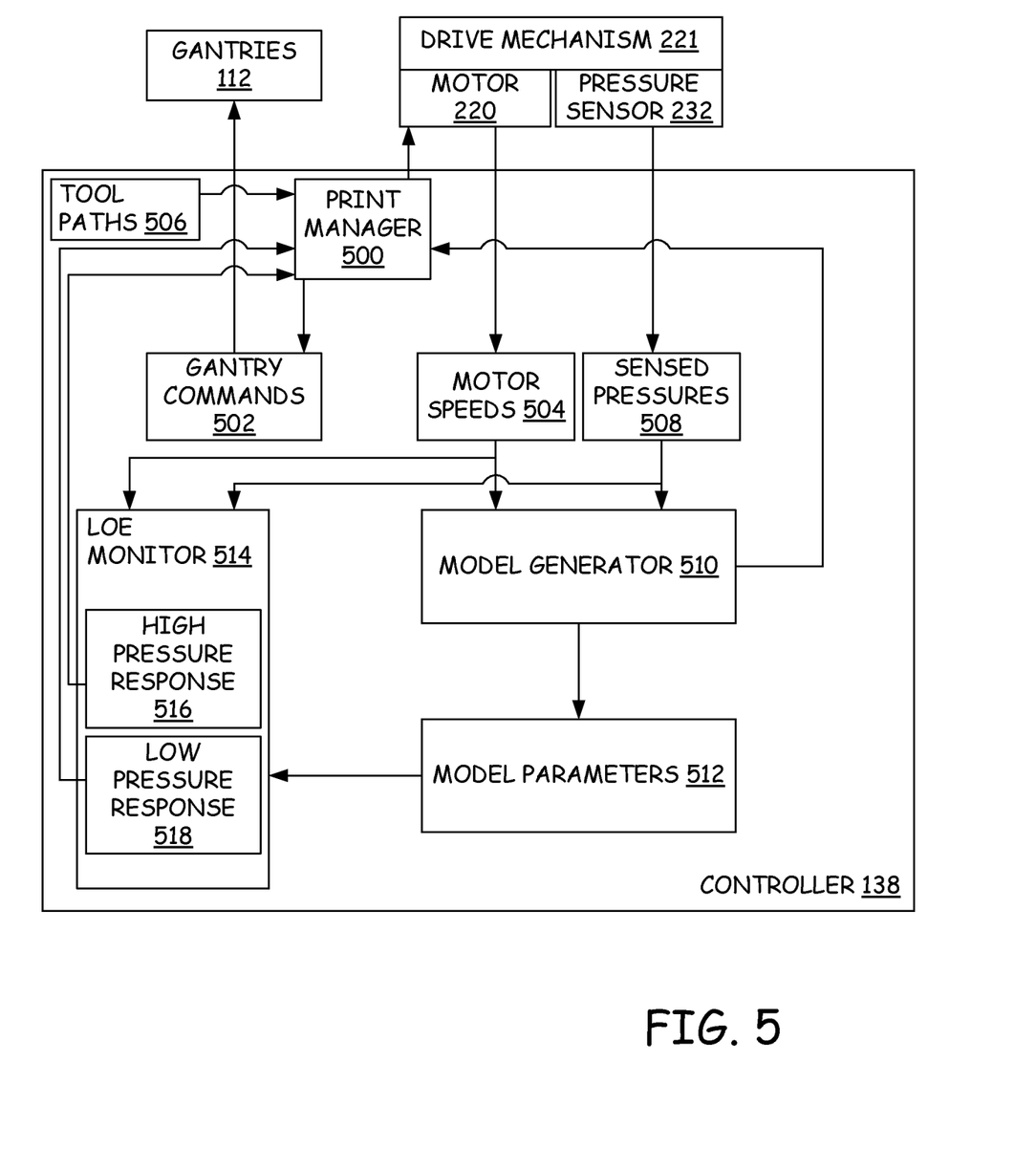
FIG. 5 is a block diagram of elements of a controller assembly in accordance with one embodiment.

FIG. 5 provides a block diagram of the components used to construct and use a model to predict a pressure value given a sequence of motor speeds. In FIG. 5, controller assembly 138 is shown to include a print manager 500 that issues gantry commands 502 and actuator speeds based on a set of tool paths 506. Print manager 500 sends gantry commands 502 to head gantry 112 to move the print head along tool paths 506. Actuator speeds are provided to motor 220 so that motor 220 will rotate drive mechanism 221 to produce an extrudate with a consistent road width and layer thickness along the tool path. The actual speed of motor 220 is measured and stored as motor speed 504.

During an initialization phase, when extruder 150 is known to be operating properly and not experiencing a Loss-Of-Extrudate event, print manager 500 issues a sequence of gantry commands 502 and a sequence of motor speeds for a set of test tool paths 506. Motor 220 rotates drive mechanism 221 based on the sequence of motor speeds resulting in measured motor speeds 504. At the same time, a pressure sensor 232 senses the pressure of molten material in the nozzle to form a sequence of sensed pressure values, which are stored as sensed pressures 508. The sequence of sensed pressures 508 and motor speeds 504 are provided to a model generator 510, which uses sensed pressures 508 and actuator speeds 504 to construct a model for the response of the sensed pressures 508 to the sequence of actuator speeds 504. In accordance with one embodiment, the model is described by a set of model parameters 512.

Figure 6:
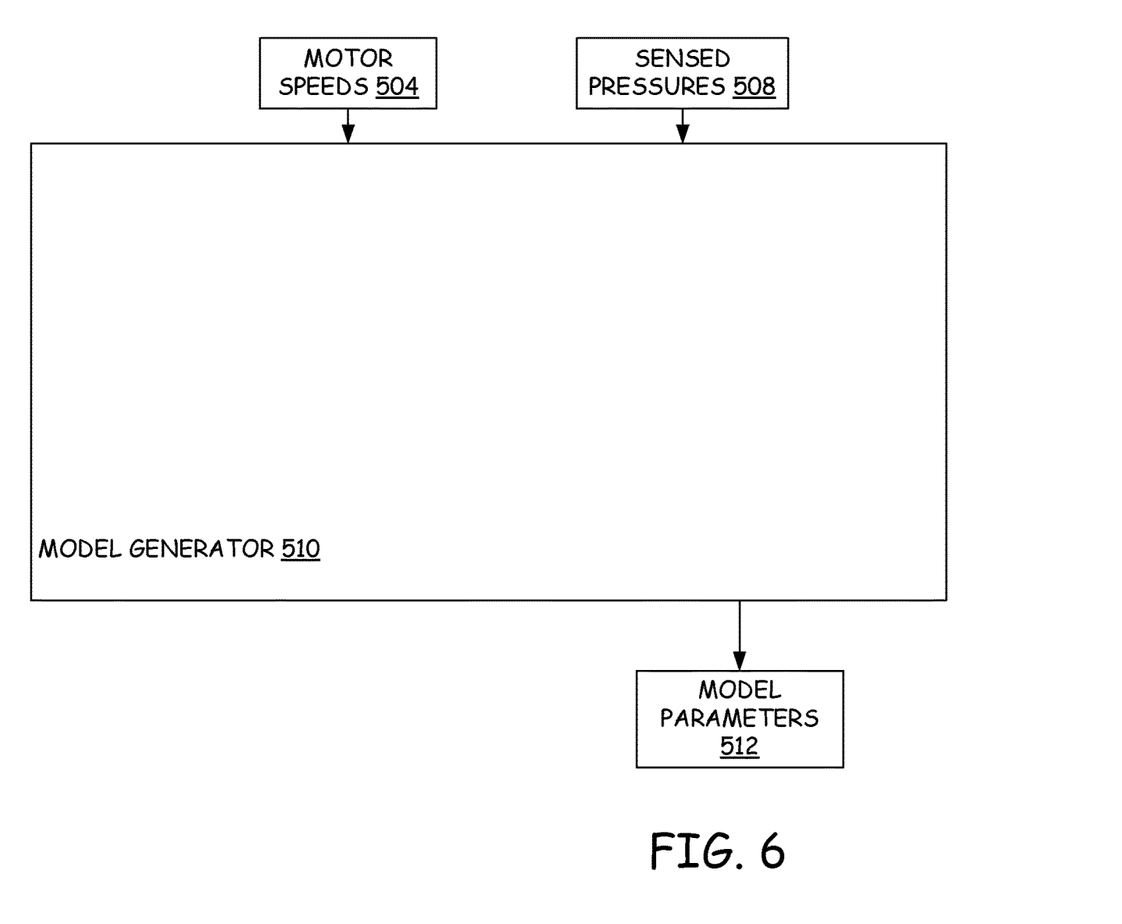
FIG. 6 is a block diagram of elements used to identify the model parameters for an algorithm that models the frequency response of the internal nozzle pressure to speed signals.

FIG. 6 provides a block diagram of one particular embodiment of model generator 510. In FIG. 6, motor speeds 504 are converted to the frequency domain using a Fourier Transform (FT). The resulting frequency domain values are low pass filtered using a low pass filter to remove higher frequency fluctuations due to signal noise. The sequence of sensed pressure values 508 corresponding to the sequence of motor speeds 504 is converted to the frequency domain using a Fourier Transform. The filtered frequency domain motor speeds output by the low pass filter and the frequency domain sensed pressures output by the Fourier Transform are provided to a frequency response calculator, which generates the frequency response of the sensed pressures to the motor speeds. In accordance with one embodiment, the frequency response calculator simply divides the frequency domain representation of the sensed pressures by the filtered frequency domain representation of the motor speeds to produce the frequency response. The resulting frequency response is provided to a filter designer, which selects filter coefficients included in the set of model parameters 512 to form a filter that models the frequency response.

Once model parameters 512 have been determined, the parameter values may be used by a Loss-Of-Extrudate (LOE) monitor 514 to set pressure limits that will trigger responses. In particular, LOE monitor 514 can generate a high pressure alert 516 and a low pressure alert 518, which are communicated back to print manager 500. In response to receiving one of the responses, print manager 500 can halt the printing of the current layer and send a message to the operator in the hopes of correcting the fault that created the LOE event and thereby save the part under construction or alter a parameter of the printing to ensure desired print quality. In accordance with one embodiment, altering a parameter of the printing includes controlling material flow through the nozzle in the closed-loop manner while compensating for response time delays during flow rate accelerations or decelerations.

Figure 7:
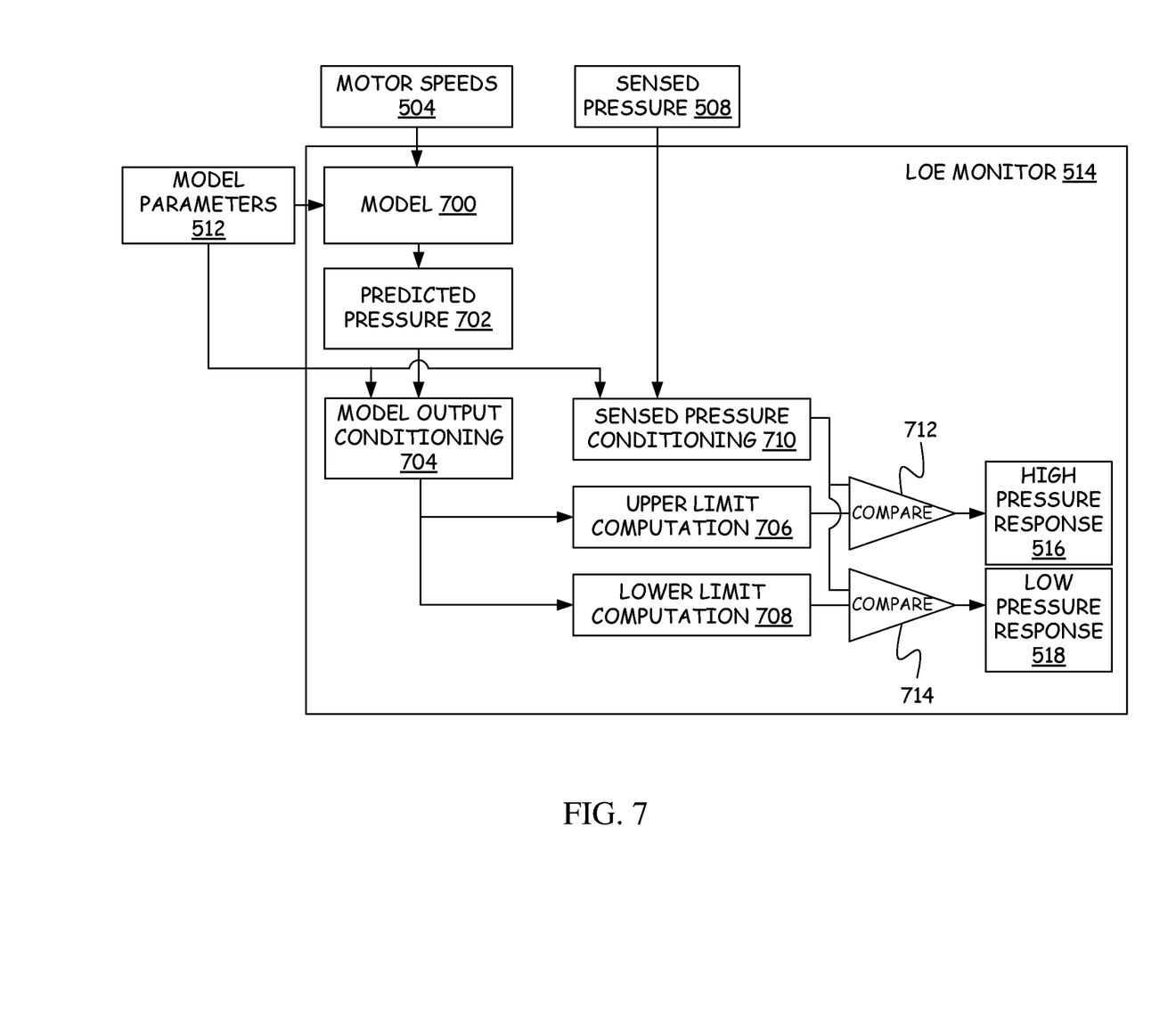
FIG. 7 is a block diagram of elements in the LOE monitor.

FIG. 7 provides a block diagram of elements in LOE monitor 514 in accordance with one embodiment. In FIG. 7, sequences of motor speeds 504 and corresponding sensed pressures 508 that are generated while producing an actual part are received by LOE monitor 514. Sequences of motor speeds 504 are produced based on the speed at which the extruder moves, which in one embodiment ranges from 0-100 inches/second. In such embodiments, the extruder extrudes material at a volumetric flow rate that has a dynamic flow range of 200:1. The sequences of motor speeds 504 are provided to model 700, which is constructed based on model parameters 512. The application of a sequence of motor speeds 504 to model 700 results in a predicted pressure 702. Predicted pressure 702 is the pressure that is expected by the model of the pressures to sequences of motor speeds. With each new motor speed value 504, a new limited-length sequence of motor speeds is applied to model 700 resulting in a separate predicted pressure 702 for each limited-length sequence of motor speeds. This produces a sequence of predicted pressures 702. The sequence of predicted pressures 702 are then further conditioned by model output conditioning 704.

In accordance with one embodiment, model output conditioning 704 begins with a clipping unit, which converts all negative predicted pressures to a value of zero. The sequence of predicted pressure values produced at the output of the clipping unit is provided to a low pass filter to de-emphasize short duration, high frequency spikes/noise. The filtered sequence is then applied to a high pass filter to remove drift/offsets inherent to pressure sensor 232. The pressure values output by the high pass filter are squared and the squared values are passed through a low pass filter before the square root of each filtered squared value is taken. This approach is utilized to more easily compare pressure changes due to both positive and negative extruder accelerations while reducing false/positives at lower pressure values.

In one particular embodiment shown in FIG. 7, the corresponding sensed pressure values 508 are conditioned by sensed pressure conditioning 710. This sensed pressure conditioning includes a low pass filter to deemphasize short duration, high frequency spikes/noise and a high pass filter to remove drifts/offsets inherent in the pressure sensor. The filtered pressure values are then squared and the squared pressure values are passed through a low pass filter before taking the square root of the filtered values to produced conditioned sensed pressure values.

FIG. 4 provides a graph 406 of the sequence of predicted pressure values output by model output conditioning 704 and graph 400 of the conditioned sensed pressure values output by sensed pressure conditioning 710. As shown in FIG. 4, predicted pressure values 406 are substantially similar to the actual pressure values 400.

The processed pressure values output by model output conditioning 704 are provided to an upper limit computation unit 706 and a lower limit computation unit 708. Upper limit computation unit 706 sets an upper pressure threshold above the predicted pressure such that if the actual pressure exceeds the upper pressure threshold, high pressure response 516 is executed. Lower limit computation unit 708 sets a lower pressure threshold such that when the actual pressure crosses below the lower pressure threshold, low pressure response 518 is executed.

In FIG. 4, graph 408 provides the value of the upper limit threshold output by upper limit computation unit 706 as a function of time and graph 410 provides the values of the lower limit threshold over the corresponding period of time. As shown in FIG. 4, upper limit threshold 408 and lower limit threshold 410 are not static but vary with the predicted pressure. In accordance with one embodiment, upper limit computation unit 716 simply adds 5000 psi to the predicted pressure from model output conditioning 704 to form the upper limit threshold and lower limit computation unit 708 simply subtracts 500 psi from the predicted pressure from model output conditioning 704 to produce the lower limit threshold.

The output of sensed pressure conditioning 710 is provided to two comparators 712 and 714. Comparator 712 compares the output pressure value from sensed pressure conditioning 710 to the upper pressure limit computed by upper limit computation unit 706. If the measured pressure output by sensed pressure conditioning 710 exceeds the upper limit threshold, high pressure response 516 executed. Comparator 714 compares the measured pressure output by sensed pressure conditioning 710 to the lower limit threshold computed by lower limit computation unit 708. If the measured pressure is below the lower limit threshold, low pressure response 518 is executed. In other words, comparators 712 and 714 determine whether the sensed pressure value differs enough from a corresponding predicted pressure value to warrant executing a response.

In an additional embodiment, sensed pressure outputs can continuously be compared with pressure targets, and the differential or error between the sensed pressure and the pressure targets can be used to adjust the motor speed and thereby provide continuous feedback control of the system. As the extruder is moving across the toolpath at variable speeds, the pressure model is able to provide changing pressure targets as the motor speed changes in correlation to the extruder velocity. As is known in classical process control, the error or differential between the measured pressure and the model's pressure target can be used to control the motor speed while ensuring that the motor speed adjustments result in a stable feedback mechanism. Thus, the motor speed is adjusted by an amount designed to achieve the pressure target in the nozzle and a desired volumetric flow rate of material out of the nozzle.

Although the present invention has been described with reference to preferred embodiments, workers skilled in the art will recognize that changes may be made in form and detail without departing from the spirit and scope of the invention.

What is claimed is:

1. An additive manufacturing system comprising:
   an extruder having a motor;
   a gantry assembly for moving the extruder along toolpaths;
   a pressure sensor producing pressure values representing sensed pressure in the extruder;
   a model, receiving speed values for the motor and generating a predicted pressure value from the speed values wherein the speed values for the motor change while the gantry moves the extruder along a tool path; and
   a response threshold module setting a response threshold pressure value based on the predicted pressure value; and
   a controller configured to receive a signal from the pressure sensor and compare the sensed pressure to the response threshold pressure value along with a signal from the model such that when the response threshold pressure value is between a pressure value from the pressure sensor and the predicted pressure value, the controller sends a signal to the extruder to adjust an extrusion rate based upon the sensed pressure and a first response is executed.

2. The additive manufacturing system of claim 1 wherein the response threshold pressure value is greater than the predicted pressure value and the alert threshold module sets a second response threshold pressure value based on the predicted pressure value such that when the second response threshold pressure value is between the pressure value from the pressure sensor and the predicted pressure value, a second response is executed.

3. The additive manufacturing system of claim 2 wherein the second response indicates a low pressure loss of extrudate event and the first response indicates a high pressure loss of extrudate event.

4. The additive manufacturing system of claim 1 wherein the model generates a frequency response of sensed pressures to sequences of speed values.

5. The additive manufacturing system of claim 1 further comprising generating a sequence of predicted pressure values from the speed values and for each predicted pressure value setting a separate response threshold pressure value.

6. The additive manufacturing system of claim 1 wherein parameters describing the model are determined from speed values and sensed pressure values produced while the extruder is following a variable speed tool path and extruding material.

7. The additive manufacturing system of claim 1 wherein the pressure sensor is at a nozzle of the extruder.

8. A method comprising:
   initializing an additive manufacturing system by constructing a model of sensed pressures to extruder speeds;
   printing a 3D part using the additive manufacturing system through steps comprising:
      sending gantry commands to a gantry assembly that moves an extruder along a toolpath according to a shape of the 3D part;
      sending extruder speed command signals to the extruder to cause the extruder to extrude material as the extruder moves along the toolpath;
      sending extruder speed signals to the model to generate a sequence of predicted pressure values;
      sensing a sequence of pressure values in the extruder and for each sensed pressure value, determining whether the sensed pressure value differs enough from a corresponding predicted pressure value in the sequence of predicted pressure values to warrant executing a response
   for each sensed pressure value, setting a high pressure response threshold that is above the corresponding predicted pressure value, wherein the high pressure response threshold is based in part on the corresponding predicted pressure value;
   wherein determining if the sensed pressure value differs enough from the corresponding predicted pressure value comprises determining if the sensed pressure value exceeds the high pressure response threshold.

9. The method of claim 8 wherein the pressure values are sensed at a nozzle of the extruder.

10. The method of claim 8 wherein the extruder speed command signals are changed as the extruder moves along the toolpaths and with each new extruder speed signal sent to the model a new pressure value is generated.

11. The method of claim 8 wherein the resulting 3D part is a near-net shape or net shape part.

12. The method of claim 11 further comprising:
   for each sensed pressure value setting a low pressure response threshold that is below the corresponding predicted pressure value and a high pressure response threshold that is above the predicted pressure value;
   wherein determining if the sensed pressure value differs enough from the corresponding predicted pressure value further comprises determining if the sensed pressure value is below the low high pressure response threshold or above the high pressure response threshold.

13. The method of claim 12 wherein the low pressure response threshold and the high pressure alert threshold are set based in part on the corresponding predicted pressure value.

14. The method of claim 8 wherein when the sensed pressure value differs enough from the corresponding predicted pressure value in the sequence of predicted pressure values to warrant executing a response, sending a response to a print manager to adjust printing of the part.

15. The method of claim 8 wherein the response comprises using a difference between the predicted pressure value and the sensed pressure value as feedback to adjust the extruder speed command signals.

16. An additive manufacturing system comprising:
   an extruder driven by motor and extruding material through a nozzle to deposit a road of the material on a part;
   a gantry assembly for moving the extruder at variable speeds along toolpaths;
   a model generator that identifies parameters for a model of how pressure in the nozzle varies with changes in motor speed;
   a loss-of-extrudate monitor that applies motor speed values to the model to produce expected pressure values, uses the expected pressure values to identify pressure thresholds that represent a loss of extrudate, and sends an error signal to a print manager when a pressure in the nozzle is beyond one of the identified pressure thresholds, so that the road of material maintains a desired size throughout the toolpath.

17. The additive manufacturing system of claim 16 wherein the loss-of-extrudate monitor identifies two pressure thresholds for each expected pressure value, with one pressure threshold greater than the expected pressure value and one pressure threshold less than the expected pressure value.

18. The additive manufacturing system of claim 16 wherein the motor speed values applied to the model are provided by the print manager to the actuator and vary over time based on a position of the nozzle along a tool path.

19. The additive manufacturing system of claim 16 wherein the filter coefficients included in the model parameters model a frequency response of the pressure in the nozzle to a sequence of motor speeds.

20. A method comprising:
    moving an extruder at variable speeds along one or more toolpaths;
    altering speeds of an extruder motor as the extruder is moved along the one or more toolpaths;
    updating high and low pressure thresholds in synchrony with altering the speeds of the extruder motor;
    sensing pressure values in a nozzle;
    comparing the sensed pressure values with the updated high and low pressure thresholds, and responsively altering a parameter of the printing to ensure desired print quality.

21. The method of claim 20, wherein altering a parameter of the printing comprises controlling material flow through the nozzle in the closed-loop manner while compensating for response time delays during flow rate accelerations or decelerations.

22. The method of claim 20, wherein the extruder extrudes material at a volumetric flow rate that has a dynamic flow range of 200:1.

23. The method of claim 20, wherein the extruder moves at speeds ranging from 0-2.54 meters/second (0-100 inches/second).

* * * * *